June 10, 1930.  W. V. VAN ETTEN  1,762,536

DIRIGIBLE HEADLIGHT

Filed Aug. 6, 1928

INVENTOR,
William V. Van Etten.
BY David E. Lain,
ATTORNEY

Patented June 10, 1930

1,762,536

UNITED STATES PATENT OFFICE

WILLIAM V. VAN ETTEN, OF BELLINGHAM, WASHINGTON

DIRIGIBLE HEADLIGHT

Application filed August 6, 1928. Serial No. 297,857.

My invention relates to improvements in dirigible steering light mounting and operating mechanism for automobiles and has for an object to provide mechanism suitable for mounting a steering light on the bumper of an automobile.

Another object of my improvement is to provide mechanism for mounting the mechanical connections to operate said steering light also on said bumper.

And a further object of my improvement is to provide mechanism to connect said operating mechanism to the drag link of the steering mechanism of the automobile.

Other objects of my improvement will appear as the description proceeds.

Figure 1:
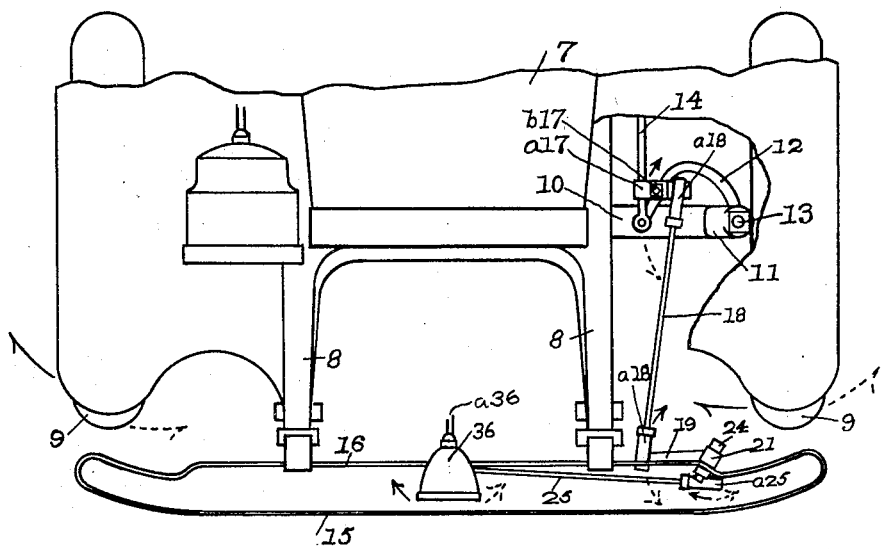
Figure 2:
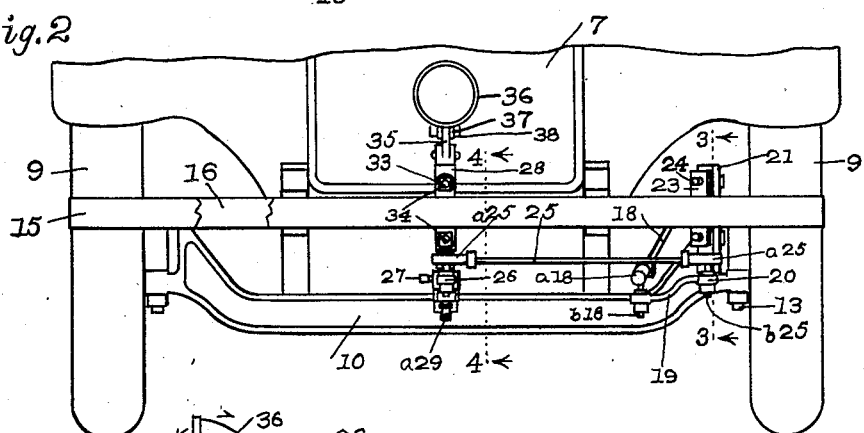
Figure 2:
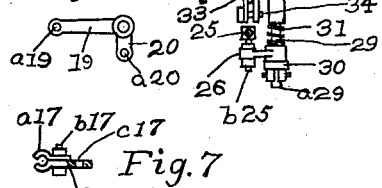
Figure 2:
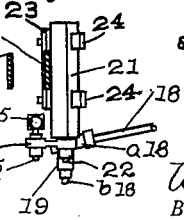
Figure 2:
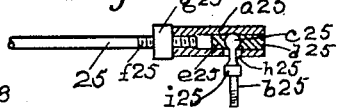

I attain these and other objects of my improvement with the mechanism illustrated in the accompanying sheet of drawings in which Figure 1 is a plan view of the front end of an automobile on which my steering light and driving mechanism therefor are mounted, the rear end of said automobile is broken away for lack of space for the illustration, Fig. 2 is a front end elevation of Fig. 1 having the upper parts thereof broken away, Fig. 3 is a cross section of a part of Fig. 2 on the line 3—3, Fig. 4 is a cross section of a part of Fig. 2 on the line 4—4, Fig. 5 is a plan view of the bell crank used in my mechanism, Fig. 6 is an elevation view in cross section of the ball and socket joint used on the ends of my connecting links drawn on a larger scale, and Fig. 7 is a side elevation of the drag-link clamp used in my mechanism.

Similar characters refer to similar parts throughout the several views.

Certain parts are broken away to show other parts hidden thereby.

With more particular reference to the designated parts: An automobile 7 has front springs 8, 8, front wheels 9, 9, front axle 10 with steering knuckle yokes 11, steering knuckle arm 12, steering knuckle pin 13, drag link in the steering mechanism 14 and bifold bumper 15, 16.

A clamp consisting of clamp bar 17, clamp plate $a^{17}$ and clamping bolt $b^{17}$ is shaped to fit over drag link 14 and is fastened thereto by said clamping bolt $b^{17}$. Connecting rod 18 has a universal joint attachment $a^{18}$ at each end thereof, and the knob bolt of one of these, see Fig. 6, is extended through hole $c^{17}$ in clamp bar 17 and retained therein by a nut to fasten said attachment to clamp 17, $a^{17}$. The universal joint attachment $a^{18}$ on the front end of connecting rod 18 is similarly connected with longer arm 19 of a bell crank.

Clamp bar 21 has a threaded pivot 22 on its lower end and on this pivot is mounted bell crank 19, 20 for oscillation and it is secured thereon with a nut on the threaded end of said pivot. Clamp bar 21 has clamp plate 23 connected therewith by clamping bolts 24 and it is clamped in a vertical position to the inner fold 16 of the bumper, near the right-hand end thereof, by engaging said bumper bar 16 between said clamp bar and plate and tightening said bolts 24.

Connecting rod 25 has a universal joint attachment $a^{25}$ on each end thereof and the one on the right-hand end is shown in Fig. 6 on a larger scale. This universal joint attachment, which is of similar construction wherever used in my mechanism consists of a hollow cylindrical body $a^{25}$ which is tapped in one end to engage rod 25 which has a threaded end on which is set nut $g^{25}$ to jamb against the end of body $a^{25}$ to retain said rod at the desired adjusted setting in said body. Plug $e^{25}$ with one concave end is pressed into the other end of said body with its concave end outward till it passes hole $h^{25}$ through the wall of said body. Then the ball end $c^{25}$ of a ball or knob bolt is extended through hole $h^{25}$ and engaged in the concave end of plug $e^{25}$, after which concave plug $d^{25}$ is pressed into the bore in said body with its concave end inward till it bears against ball $c^{25}$. Thus the concave ends of said plugs provide the socket for ball $c^{25}$ and the knob bolt has a limited oscillatory movement in hole $h^{25}$. The knob bolt is provided with a boss enlargement for a shoulder $i^{25}$ and a threaded bolt end $b^{25}$.

Bolt $b^{25}$ is extended through hole $a^{20}$ in the shorter arm 20 of the bell crank and fastened therein with a nut to connect rod 25 with said arm 20 of the bell crank. The universal joint attachment $a^{25}$ on the left-hand end of rod 25 is connected in a similar manner with crank 26.

Short vertical shaft 29 is mounted for revolution or oscillation in bearing 28. Bearing 28 has bracket clamp bar 32 integral therewith and said bar is fitted with clamp plate 33 and clamping bolts 34. Said clamping attachment to the bearing is disposed on inner bar 16 of the bumper preferably near its center with said bumper bar between clamp bar 32 and clamp plate 33 which are retained in clamped relation on bumper bar 16 by bolts or cap screws 34, 34 which are extended through openings in plate 33 and engaged in tapped holes in clamp bar 32.

Crank 26 is mounted on the lower end of vertical shaft 29 to which it is fastened by set screw 27 at a space below the lower end of bearing 28 and coil spring 31 is mounted in this space on shaft 29 to react between said bearing and crank. As a further means to retain crank 26 on shaft 29 castle nut 30 is engaged on the threaded lower end $a^{29}$ of said shaft and jambed against said crank and retained in place with a pin or spring cotter extended through a hole in said shaft and an opening in said nut in the usual manner.

On the upper end of shaft 29 is mounted arm 35 to bear against the upper end of bearing 28. Said arm is fastened to the shaft with a pin extended through said shaft and arm and is retained in contact with bearing 28 by spring 31.

Guide lamp lantern 36 has ears 37 projecting from its lower wall. These ears have openings therethrough and are clamped to the upper end of arm 35 by bolt 38 which is extended through said ear holes and through an opening in said upper end of arm 35. This method of clamping the lamp to the arm allows it to be swung about bolt 38 as a pivot, when the nut on said bolt is loosened, and when set in the desired vertical direction, said nut is tightened and the lamp is clamped in position, such as is desired, to cause its rays to impinge on the ground at the required distance in front of the car.

Electric wires $a^{36}$ are connected to the source of electric current supply as usual.

In Fig. 1 full-line and dotted-line arrows are used to indicate the operative directions of simultaneous oscillations of wheels 9, drag link 14, arm 12, bell crank 19—20, and crank 26 and guide light 36, by which is clearly indicated that the wheel oscillations on the steering knuckle pivots, one of which is shown at 13, caused by the reciprocation of drag link 14 are duplicated in kind by oscillations of guide lamp 36 on shaft 29. That is, when wheels 9 swing toward the left hand, as indicated by full-line arrows, lamp 36 also swings toward the left. Also when wheels 9 swing toward the right hand, as indicated by dotted-line arrows, lamp 36 swings toward the right hand. In this way the guide light is caused to follow the curving road into which drag link 14 directs the car and the path is illuminated thereby before the fixed headlights are adjusted to the new direction.

The arc length of the oscillations of lamp 36 is largely predetermined by the relative lengths of the arms of the bell crank and crank 26, while the adjustments in dimensions of the elements of my mechanism is attained by suiting the lengths of connecting rods 18 and 25 to the desired locations on the car for the several parts attached thereto.

The adjustment of lamp 36 in the plane of shaft 29, as stated, is provided for by the setting of clamping bolt 38 following the placing of said lamp in the desired position in the arc indicated by the arrows in Fig. 4.

Having thus disclosed my improvement, what I claim as new therein and desire to secure by Letters Patent is,—

A dirigible steering light mounting and operating mechanism consisting of, a clamp bar attachable to the drag link of the steering mechanism of an automobile, an adjustable connecting rod one end of which is connected to said drag-link-clamp bar by a universal joint and the other end of which is engaged with one arm of a bell crank by a universal joint, said bell crank pivotally engaged with a clamp, said bell-crank clamp fastenable to a bar of the front bumper of said automobile, another adjustable connecting rod one end of which is engaged with the other arm of said bell crank by a universal joint and the other end of which is engaged with a crank by a universal joint, said crank adjustably fastened to one end of a short vertical shaft to oscillate therewith, said vertical shaft mounted for oscillation in a vertical bearing, a clamp fastened to said bearing for attachment to a bar of said front bumper, an arm fastened to the other end of said vertical shaft to oscillate therewith having an opening through the outer end thereof, the lantern of an electric headlight, ears fastened to the walls of said lantern having registering openings therethrough, a clamping bolt extended through said ears and through said arm to retain said lantern in a desired angular relation with said arm, and a coil spring mounted on said vertical shaft to react between said crank and said bearing.

WILLIAM V. VAN ETTEN.